(12) United States Patent
Zhang et al.

(10) Patent No.: US 9,516,729 B2
(45) Date of Patent: Dec. 6, 2016

(54) VARIABLE RADIUS MIRROR DICHROIC BEAM SPLITTER MODULE FOR EXTREME ULTRAVIOLET SOURCE

(71) Applicant: ASML Netherlands B.V., Veldhoven (NL)

(72) Inventors: Kevin W Zhang, San Diego, CA (US);
Michael Purvis, San Diego, CA (US);
Robert J Rafac, San Diego, CA (US);
Alexander Schafgans, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/804,976

(22) Filed: Jul. 21, 2015

(65) Prior Publication Data
US 2016/0174351 A1    Jun. 16, 2016

Related U.S. Application Data

(60) Provisional application No. 62/092,493, filed on Dec. 16, 2014.

(51) Int. Cl.
| | |
|---|---|
| *H05G 2/00* | (2006.01) |
| *G02B 27/14* | (2006.01) |
| *G02B 26/08* | (2006.01) |
| *G01J 11/00* | (2006.01) |

(52) U.S. Cl.
CPC .............. *H05G 2/003* (2013.01); *G01J 11/00* (2013.01); *G02B 26/0825* (2013.01); *G02B 27/141* (2013.01); *H05G 2/005* (2013.01); *H05G 2/008* (2013.01)

(58) Field of Classification Search
CPC . G01J 11/00; G02B 26/0825; G02B 27/141; H05G 2/003; H05G 2/008
See application file for complete search history.

(56) References Cited

U.S. PATENT DOCUMENTS

| | | | |
|---|---|---|---|
| 2010/0127191 A1* | 5/2010 | Partlo | H05G 2/008 250/504 R |
| 2010/0201962 A1 | 8/2010 | Juergens | |
| 2012/0138805 A1 | 6/2012 | Missalla | |
| 2013/0321926 A1* | 12/2013 | Bergstedt | G02B 27/145 359/634 |

OTHER PUBLICATIONS

International Search Report and Written Opinion (mailed Feb. 1, 2016) in Corresponding Counterpart PCT Application No. PCT/US15/61165 (International Filing Date Nov. 17, 2015)—10 pages.

* cited by examiner

*Primary Examiner* — Mark R Gaworecki

(57) ABSTRACT

A laser produced plasma extreme ultraviolet laser source comprising at least one variable radius mirror. The at least one variable radius mirror to adjust a beam diameter of a main pulse at a specified distance from a pre-pulse focal plane, where the pre-pulse radiates droplets into target droplets and the main pulse radiates the target droplets into a plasma state to generate the extreme ultraviolet radiation.

20 Claims, 12 Drawing Sheets

(At 495 microns)

(at 410 microns)

VARIABLE RADIUS MIRROR DICHROIC BEAM SPLITTER MODULE FOR EXTREME ULTRAVIOLET SOURCE

The present application claims priority under 35 USC 119(e) to a commonly owned provisional patent application entitled "Variable Radius Mirror Dichroic Beam Splitter Module for Extreme Ultraviolet Source", U.S. Application No. 62/092,493, filed in the US Patent Office on Dec. 16, 2014 and incorporated herein by reference.

FIELD

The disclosed embodiments pertain to optical systems and laser sources, and particularly to adjusting optics of a laser source.

BACKGROUND

Developing an efficient and reliable source of EUV (Extreme Ultraviolet) radiation for semiconductor lithography is an active area of research. In one approach, a laser source, such as a $CO_2$ laser, irradiates tin (Sn) droplets so that each droplet is heated into a plasma state. Radiation generated by the tin plasma includes radiation at a wavelength of about 13.5 nm. Radiation at other wavelengths may be filtered out, thereby providing an EUV source so that various lithographic steps may be carried out at the 13.5 nm wavelength. Such a source is referred to as an LPP (Laser Produced Plasma) EUV radiation source.

FIG. 1 is a simplified drawing illustrating some of the components of an LPP EUV radiation source 100. A droplet generator 102 provides drops of molten tin that are irradiated by a pre-pulse of radiation, indicated pictorially by the tin droplet 104 within the pre-pulse 106. It is to be understood that embodiments are not limited to tin as the irradiated material. The pre-pulse 106 shapes and expands a tin droplet into a target so that the target may better absorb the energy of a main pulse of radiation, where the main pulse heats the tin to a plasma state, or further converts the tin to a plasma state if the pre-pulse 106 is sufficient to heat some or all of the tin to a plasma state.

For example, the tin droplet 104 after being shaped by the pre-pulse 106 is represented by the tin target 108, shown as a flattened disc oblique with respect to the z axis of the reference coordinate system 110. The tin target 108 is shown within the main pulse 112 to pictorially represent irradiation of the tin target 108. A collector 114 focuses the EUV radiation generated by the tin plasma to some intermediate focus point at which the EUV radiation is provided to a lithography tool (not shown).

In the particular example of FIG. 1, the pre-pulse 106 is generated by a laser oscillator, referred to as the pre-pulse laser 116. The output of the pre-pulse laser 116 is provided to one or more power amplifiers 118 by way of one or more mirrors 120 and one or more dichroic splitters 122. The main pulse 112 is generated by a laser oscillator, referred to as a main pulse laser 124. The output of the main pulse laser 124 is also provided to the one or more power amplifiers 118.

In the particular example of FIG. 1, the wavelength of the pre-pulse laser 116 is different from that of the main pulse laser 124, where the one or more dichroic splitters 122 allow for the proper feeding of the outputs of the pre-pulse laser 116 and the main pulse laser 124 to the one or more power amplifiers 118. The pre-pulse 106 and the main pulse 112 are directed through an opening in the collector 114 to, respectively, the tin droplet 104 and the tin target 108. The obliqueness of the tin target 108 with respect to the z-axis helps to mitigate reflection of the main pulse 112 off of the tin target 108 and back through the opening of the collector 114 to the one or more power amplifiers 118. A portion of the output of the power amplifiers 118 is reflected off of the splitter 115 and to the power meter 117 so that the output of the power amplifiers 118 may be measured.

To mitigate the absorption of EUV radiation generated by the tin plasma, the irradiation of the tin droplets takes place in a chamber 119 held at low pressure, where the low pressure may be referred to as a vacuum. Accordingly, some modules for providing the pre-pulse 106 and the main pulse 112 to the tin, such as the final focus module 121, are utilized within a vacuum and therefore are shown within the chamber 119. Other modules may be utilized at ordinary atmospheric pressure. A window 123 in the chamber 119 serves as an optical interface between the chamber 119 and other modules at ordinary atmospheric pressure, so that the pre-pulse 106 and the main pulse 112 provided to the final focus module 121 may be generated by modules operating at ordinary atmospheric pressure.

For ease of illustration, the modules outside the chamber 119 for focusing and steering the pre-pulse 106 and the main pulse 112 are lumped together into the beam steer and focus module 126. Other structures and arrangements of one or more laser oscillators may be utilized to provide the pre-pulse 106 and the main pulse 112 to the tin. For example, a single seed laser may be used in the generation of the pre-pulse 106 and the main pulse 112. Not all components important for the generation of EUV radiation are illustrated. For example, not shown in FIG. 1 are pumps to evacuate gas from the chamber 119, control units for the laser oscillators, and modules for mitigating the effects of debris from the irradiated tin.

The beam steer and focus module 126 includes the dichroic splitter module 128, shown in expanded form by way of arrow 129. The label "MP" refers to main pulse and the label "PP" refers to pre-pulse. The two dichroic splitters 130 and 132 allow the pre-pulse 106 to pass through the dichroic splitter module 128 toward the tin droplet 104. The combination of the dichroic splitter 130, the mirror 134, the mirror 136, and the dichroic splitter 132 reflects the main pulse 112 toward the tin target 108. The relative orientation of the mirror 136 to the dichroic splitter 132 steers the main pulse 112 in a direction different from that of the pre-pulse 106. One or both of the mirrors 134 and 136 may be curved so that the focus of the main pulse 112 is in a different focal plane than that of the pre-pulse 106 to take into account the displacement of the tin target 108 relative to the tin droplet 104.

The beam steer and focus module 126 includes the final focus metrology module 131. Fractional portions of the pre-pulse 106 and the main pulse 112 are reflected off of the window 123 and directed by way of the mirror 133 to the final focus metrology module 131 so that various metrology and diagnostic functions of the pre-pulse 106 and the main pulse 112 may be carried out. Included in the final focus metrology module 131 is the wavefront sensor 135 to measure the intensity and phase at various points in a wavefront of the main pulse 112. The beam steer and focus module 126 may include other optics, but for simplicity only the dichroic splitter module 128, the final focus metrology module 131, and the mirror 133 are illustrated.

FIG. 2 expands upon the drawing of the tin droplet 104 and the tin target 108 of FIG. 1. It may be desirable to irradiate the tin droplet 104 and the tin target 108 so that efficient use is made of the irradiating power, and so that the temperature of the resulting plasma is close to some specified optimum temperature so as to maintain a desirable conversion efficiency. Conversion efficiency may be defined as the ratio of EUV radiation energy generated by the tin plasma to the energy required to generate the main pulse 112.

It is expected that to maintain conversion efficiency at some specified level, the main pulse 112 should irradiate the tin target 108 at some specified constant (or nearly constant) irradiance. Consequently, it is expected that the beam diameter of the main pulse 112 at the position of the tin droplet 108 should be commensurate with the surface area of the tin droplet 108 presented to the main pulse 112, where the irradiance is at some specified level. (The beam diameter at some position may also be referred to as the diameter of the caustic at that position, or simply the caustic.) Accordingly, the pre-pulse focal plane 202, which may be taken as the plane intersecting the beam waist of the pre-pulse 106, may not coincide with the position at which the tin droplet 104 is irradiated. Similarly, the main pulse focal plane 204, which may be taken as the plane intersecting the beam waist of the main pulse 112, may not coincide with the position at which the tin target 108 is irradiated.

As illustrated in FIG. 2, there is a displacement $\Delta x$ along the x-axis from where the tin droplet 104 is irradiated to where the tin target 108 is irradiated. The displacement $\Delta x$ may vary over time, and may depend upon the size of the tin droplet 104 and its speed of descent along the x-axis. The tin droplet 104 may be formed out of multiple smaller droplets emitted from the droplet generator 102, where one or more of these smaller droplets coalesce into the tin droplet 104. There is also a displacement $\Delta z$ along the z-axis from where the tin droplet 104 is irradiated to where the tin target 108 is irradiated. The displacement $\Delta z$ is in part due to irradiating and heating the tin droplet 104, and may depend upon the size of the tin droplet 104 and its speed of descent. Consequently, the displacement $\Delta z$ may vary over time.

FIG. 2 is idealized in that the beams are illustrated as having a finite profile perfectly matched to the size of the tin droplet 104 or the tin target 108. In practice, the beams have a profile for which the majority of the irradiance is intercepted by the tin droplet 104 or the tin target 108.

The EUV radiation power resulting from the tin plasma formed by irradiating the tin target 108 may depend among many variables, some of which may include the sizes of the tin droplet 104 and the tin target 108, and the rate of tin droplet generation. Accordingly, the displacements $\Delta x$ and $\Delta z$ may depend upon the power operating node of the LPP EUV radiation source 100, so that the positions of the pre-pulse focal plane 202 and the main pulse focal plane 204 may need to be adjusted depending upon the power operating node. However, adjusting the optics to re-position the focal planes may be expensive and time consuming for presently available LPP EUV sources.

BRIEF DESCRIPTION OF THE DRAWINGS

The present invention is illustrated by way of example, and not by way of limitation, in the figures of the accompanying drawings and in which like reference numerals refer to similar elements and in which.

SUMMARY OF THE INVENTION

Figure 1:
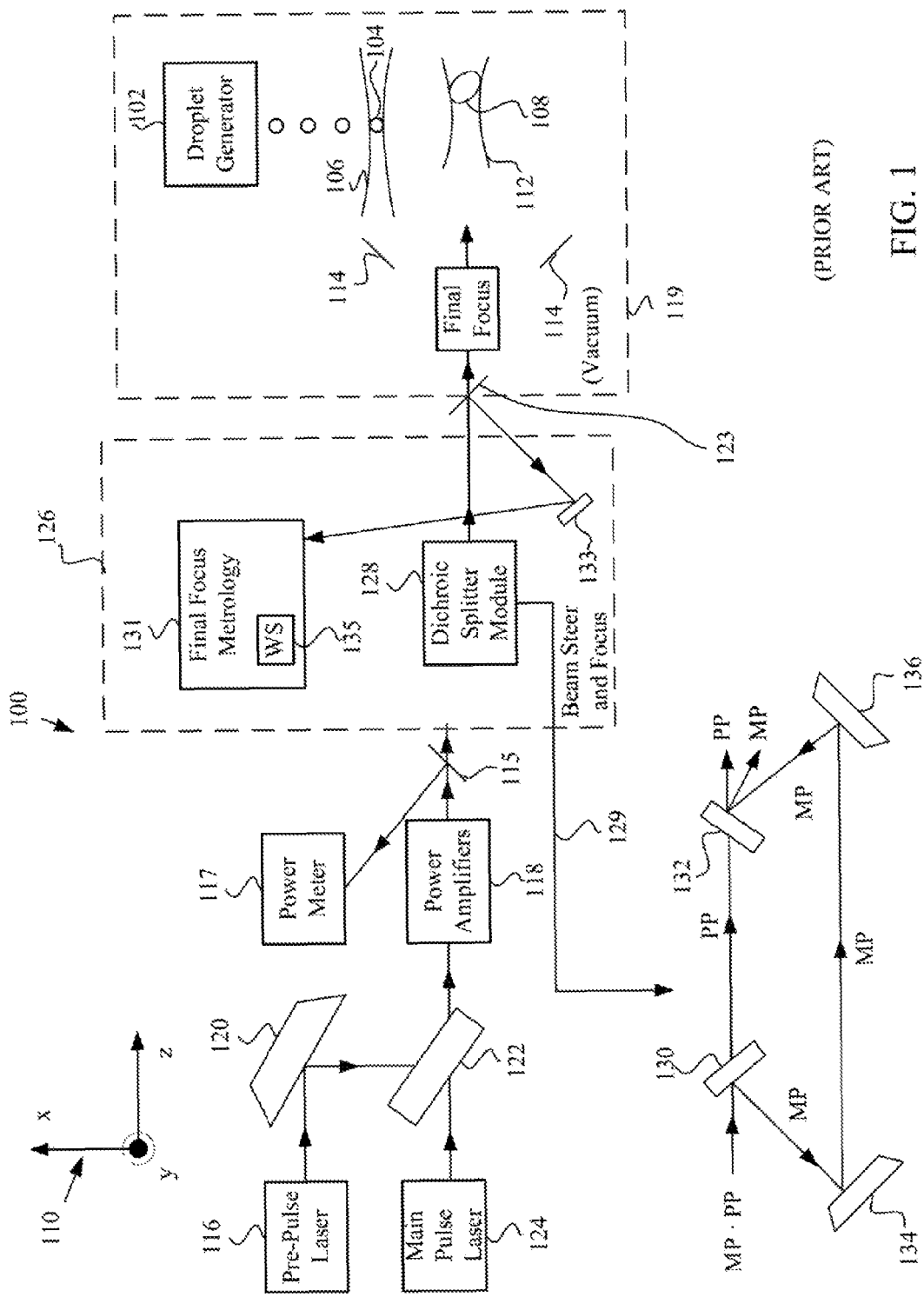
FIG. 1 illustrates various components of an extreme ultraviolet radiation source.

In one or more embodiments, the invention relates to an extreme ultraviolet radiation source comprising a droplet generator to provide a droplet; at least one laser source to provide a pre-pulse to irradiate the droplet so as to provide a target droplet, the pre-pulse having a focal plane, and to provide a main pulse to irradiate the target droplet into a plasma state, the main pulse having a focal plane; a dichroic splitter module to focus the pre-pulse and the main pulse, the dichroic splitter module comprising at least one variable radius mirror; and a controller coupled to the at least one variable radius mirror to adjust a radius of curvature of the at least one variable radius mirror to adjust a distance between the focal plane of the pre-pulse and the focal plane of the main pulse.

In another embodiment, the invention relates to a method for providing a laser beam to an EUV light generating chamber, comprising propagating a pre-pulse through a dichroic splitter module toward the chamber, the pre-pulse having a focal plane within the chamber, the dichroic splitter module comprising a first dichroic splitter, a second dichroic splitter, and a variable radius mirror having a radius of curvature; propagating a main pulse through the dichroic splitter module toward the chamber, the propagating the main pulse through the dichroic splitter module comprising reflecting the main pulse with the variable radius mirror and reflecting the main pulse with the second dichroic splitter toward the chamber, the main pulse having a beam diameter at a specified distance from the focal plane of the pre-pulse; measuring the main pulse to provide a set of values indicative of the beam diameter at the specified distance for a set of values indicative of the radius of curvature of the variable radius mirror; and storing in a memory a data structure indicative of the set of values indicative of the beam diameter and the set of values indicative of the radius of curvature of the variable radius mirror, the data structure providing a one-to-one mapping of the set of values indicative of the beam diameter to the set of values indicative of the radius of curvature of the variable radius mirror.

In yet another embodiment, the invention relates to a method for providing a laser beam to an EUV light generating chamber comprising propagating a pre-pulse through a dichroic splitter module toward a chamber, the pre-pulse having a focal plane within the chamber, the dichroic splitter module comprising a first dichroic splitter, a second dichroic splitter, a first variable radius mirror having a first radius of curvature, and a second variable radius mirror having a second radius of curvature; propagating a main pulse through the dichroic splitter module toward the chamber, the propagating the main pulse through the dichroic splitter module comprising reflecting the main pulse with the first dichroic splitter, reflecting the main pulse with the first variable radius mirror and the second variable radius mirror, and reflecting the main pulse with the second dichroic splitter toward the chamber, the main pulse having a beam diameter at a specified distance from the focal plane of the pre-pulse; measuring the main pulse to provide a family of sets of values indicative of the beam diameter at the specified distance for a family of sets of values indicative of the first radius of curvature of the first variable radius mirror, each set of values indicative of the beam diameter and each set of values indicative of the first radius of curvature indexed by a set of values indicative of the second radius of curvature of the second variable radius mirror, and storing in a memory a data structure indicative of the family of sets of values indicative of the beam diameter and the family of sets of values indicative of the first radius of curvature of the first variable radius mirror.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In the description that follows, the scope of the term "some embodiments" is not to be so limited as to mean more than one embodiment, but rather, the scope may include one embodiment, more than one embodiment, or perhaps all embodiments.

Figure 2:
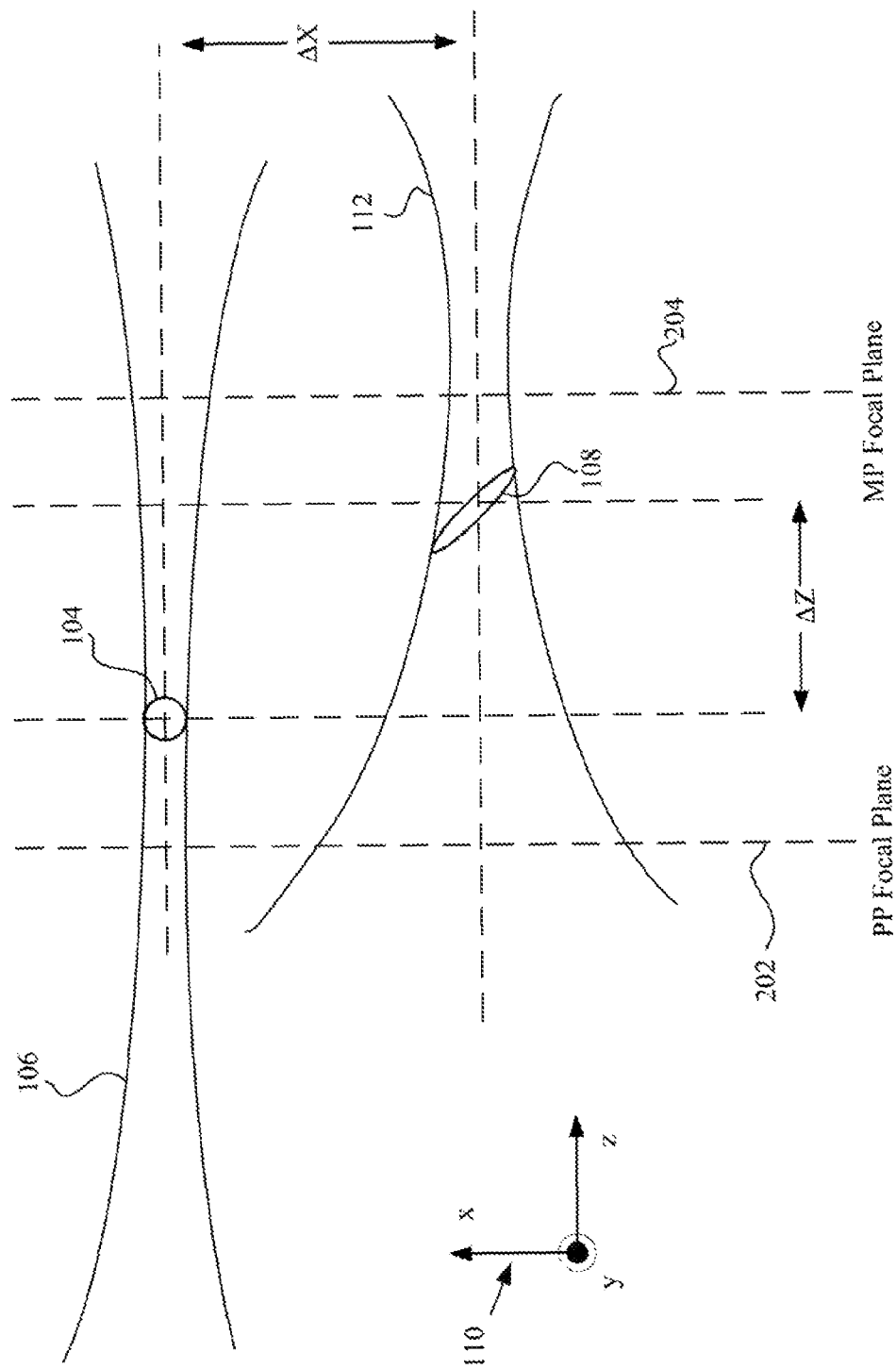
FIG. 2 illustrates portions of the extreme ultraviolet radiation source of FIG. 1 in more detail.

It may be desirable to operate an LPP EUV radiation source at several power nodes, such as for example at the 80 W, 125 W, and 350 W power nodes, where the conversion efficiency is maintained at or near a specified value at each power node. Operating at a particular power node may be realized by properly adjusting the size of the tin target 108 (which depends upon the size of the tin droplet 104) and properly adjusting the power and pulse shape of the main pulse 112, while maintaining the irradiance of the tin target 108 at some specified value. However, as discussed with respect to FIG. 2, the relative position of the tin target 108 depends upon its size and the operating power node.

Furthermore, in some applications it may be desirable at times to operate an LPP EUV radiation source at a reduced power node with reduced main pulse power. For example, there may be periods of time for which an LPP EUV radiation source experiences self-lasing, exhibits problems regarding radio frequency generation used for a $CO_2$ main pulse laser, or exhibits a reduction in cooling efficiency. For some embodiments, it is desirable for a LPP EUV radiation source to satisfy certain peak and average main pulse irradiance requirements. To reduce instability, it is also desirable to mitigate the reflection of the main pulse 112 off of the tin target 108 and back into the one or more power amplifiers 118.

In light of the above-described issues, it is desirable for an embodiment to adjust the main pulse focal plane 204 and beam diameter (or caustic) of the main pulse 112 in an efficient manner that is economical and robust.

Figure 3:
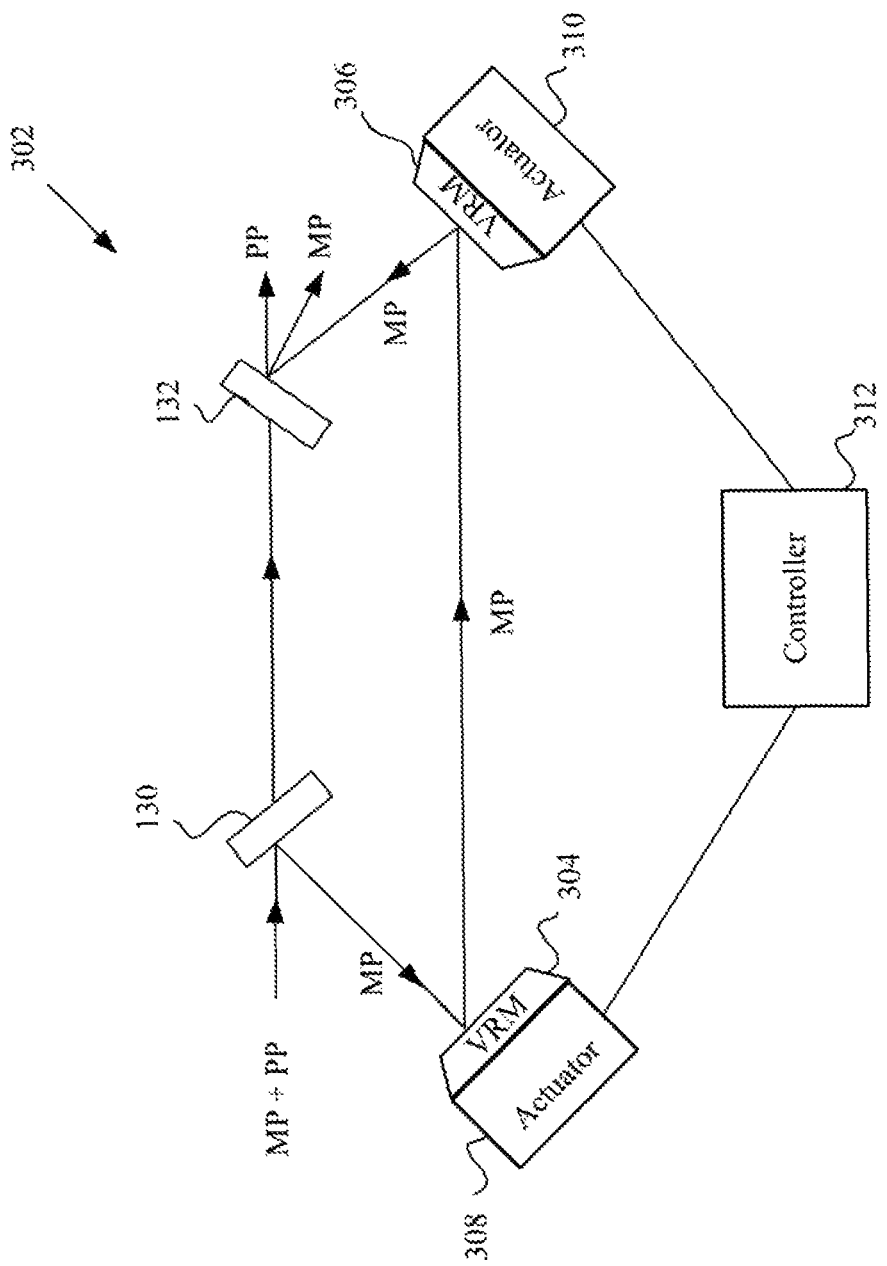
FIG. 3 illustrates a beam steer and focus module according to an embodiment.

FIG. 3 illustrates a dichroic splitter module 302 according to an embodiment. As before, the dichroic splitters 130 and 132 allow for the separation of a main pulse from a pre-pulse, but one or both of the mirrors 304 and 306 are variable radius mirrors. In the particular embodiment of FIG. 3, each of the mirrors 304 and 306 is illustrated as a variable radius mirror (VRM). For other embodiments, only one of the mirrors 304 and 306 may be a VRM. For example, in an embodiment, the mirror 306 may be VRM and the mirror 304 may be a fixed mirror. Embodiments are not limited to a particular type of VRM, but as an example, VRMs are available from the II-VI Infrared division of II-VI Incorporated®, headquartered in Saxonburg, Pa.

In the embodiment of FIG. 3, the actuator 308 adjusts the radius of curvature of the mirror 304 by applying pressure. The actuator 308 may comprise channels for admitting a fluid, such as water, where the water pressure determines the radius of curvature for the mirror 304. Similar remarks apply to the mirror 306 and its corresponding actuator 310. The actuators 308 and 310 are controlled by the controller 312. Sensors, not shown, may be included with the mirror 304 and the mirror 306 to provide feedback to the controller 312. The controller 312 may comprise a computer under control of a software program.

Varying the radius of curvature for one or both of the mirrors 304 and 306 provides for varying the positions of one or both of the pre-pulse focal plane 202 and the main pulse focal plane 204 in an efficient and cost-effective manner. As discussed previously, varying the position of beam focus is of utility in improving conversion efficiency stability and in implementing various power nodes. Furthermore, varying the axial separation of the pre-pulse focal plane 202 and the main pulse focal plane 204 may help mitigate laser radiation from being reflected off of the tin target 108 and back into the one or more power amplifiers 118, thereby helping to improve EUV stability.

Figure 4:
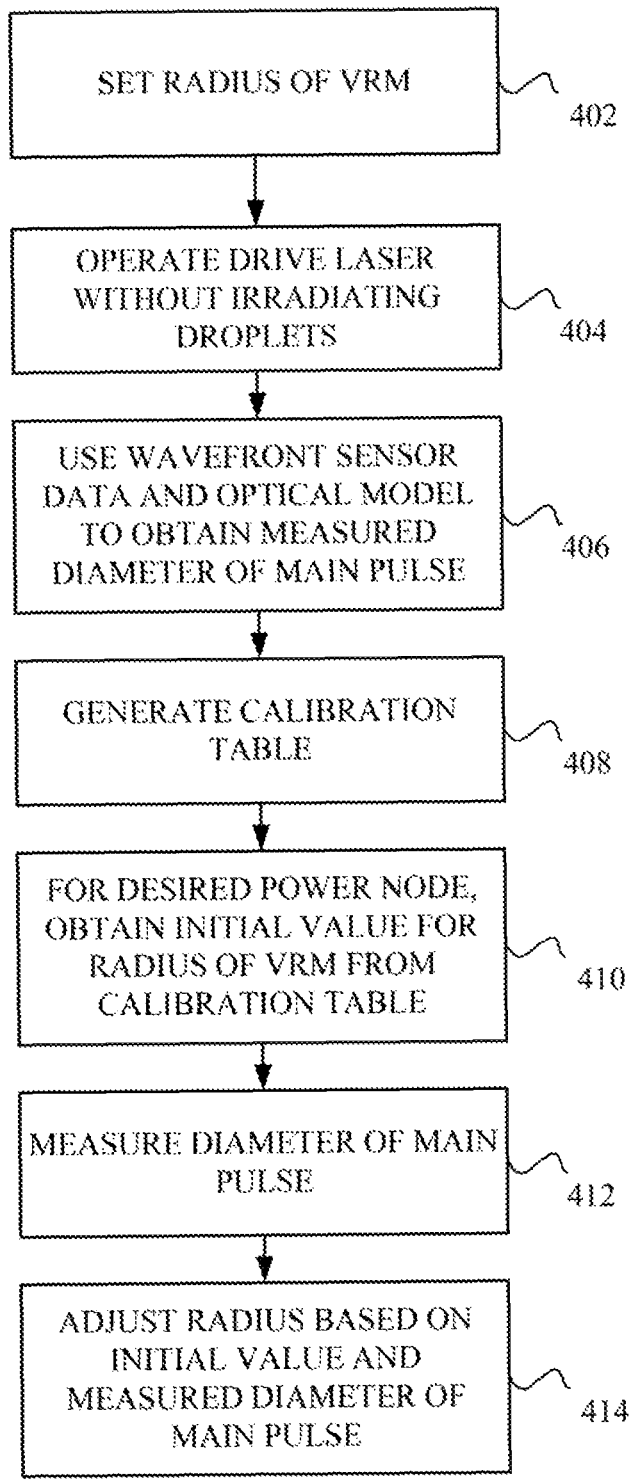
FIG. 4 illustrates a flow diagram for setting a variable radius mirror according to an embodiment.

FIG. 4 illustrates a flow diagram for setting the radius of curvature for a VRM, which for simplicity may be referenced in FIG. 4 as simply the "radius of VRM". First, steps 402, 404, and 406 are used as follows to generate a calibration table (or curve), where the calibration table provides the relationship between the radius of the VRM and the beam diameter (caustic) of the main pulse at some specified nominal irradiation position. In step 402, the radius of curvature for a VRM, which may be either the mirror 304 or the mirror 306, is set to some nominal value. In step 404, the main pulse laser 124, referred to as a drive laser in FIG. 4, is operated without irradiating a tin droplet. For example, the droplet generator 102 may be turned off during step 404, or a tin droplet may be directed sufficiently away from the nominal irradiation position. In step 406, the wavefront sensor 135, along with the appropriate optical model for the final focus module 121, is used to obtain the beam diameter of the main pulse 112 at some specified irradiation position relative to the pre-pulse focal plane 202. For example, this position may be specified as being a distance of 150 microns from the pre-pulse focal plane 202.

Steps 402, 404, and 406 are performed multiple times with different values of the radius of the VRM to generate the calibration table in step 408. Once the calibration table is generated, a mapping is obtained between the value of the radius of a VRM and the resulting beam diameter of the main pulse 112 at some specified distance from the pre-pulse focal plane 202. If the LPP EUV radiation source 100 is to operate at some desired power node, then the beam diameter of the main pulse associated with the desired power node is used with the calibration table to provide an initial value for the radius of the VRM.

Calculating the main pulse beam cross section diameter associated with a desired power node may be performed by operating the LPP EUV radiation source 100 without irradiating tin and measuring the peak power of the output of the power amplifiers 118 by using the power meter 117. With knowledge of the duty cycle of the main pulse laser 124 and the pulse time duration of the main pulse 112, the beam diameter may be calculated based upon some known irradiance associated with the desired power node. For example, if an irradiance of $I_0$ $GW/cm^2$ is known by experiment to provide some desired power node, then the desired cross section diameter may be taken as that diameter for which the cross section area is equal to the peak power divided by $I_0$ $GW/cm^2$. This computation may be performed before field operation of the LPP EUV radiation source 100. In particular, multiple computations may be performed for various power nodes, where the computed results are stored in a lookup table to provide desired beam diameters for various power nodes.

Once the calibration table is available, in step 410 an initial value for the radius of a VRM may be obtained for a desired power node. To fine tune this initial value, in step 412 the LPP EUV radiation source 100 is operated without irradiating tin, and the diameter of the main pulse is measured. Based upon the measured diameter and the desired diameter, in step 414 the radius of the VRM is adjusted.

More generally, the calibration table curve provides the cross section diameter of the main pulse 112 at some specified distance from the pre-pulse focal plane 202 (e.g., 150 microns) as a function of a variable indicative of the radius of curvature of one or both of the VRMs. This variable may be a normalized pressure representing the pressure applied to a VRM to set its radius of curvature. As another example, the variable may be a voltage provided by the controller 312 to the actuator 308. Or, the variable may be some dimensionless number stored in a register within the controller 312, where there is a one-to-one mapping of the register value to the radius of curvature of one of the VRMs.

Figure 5:
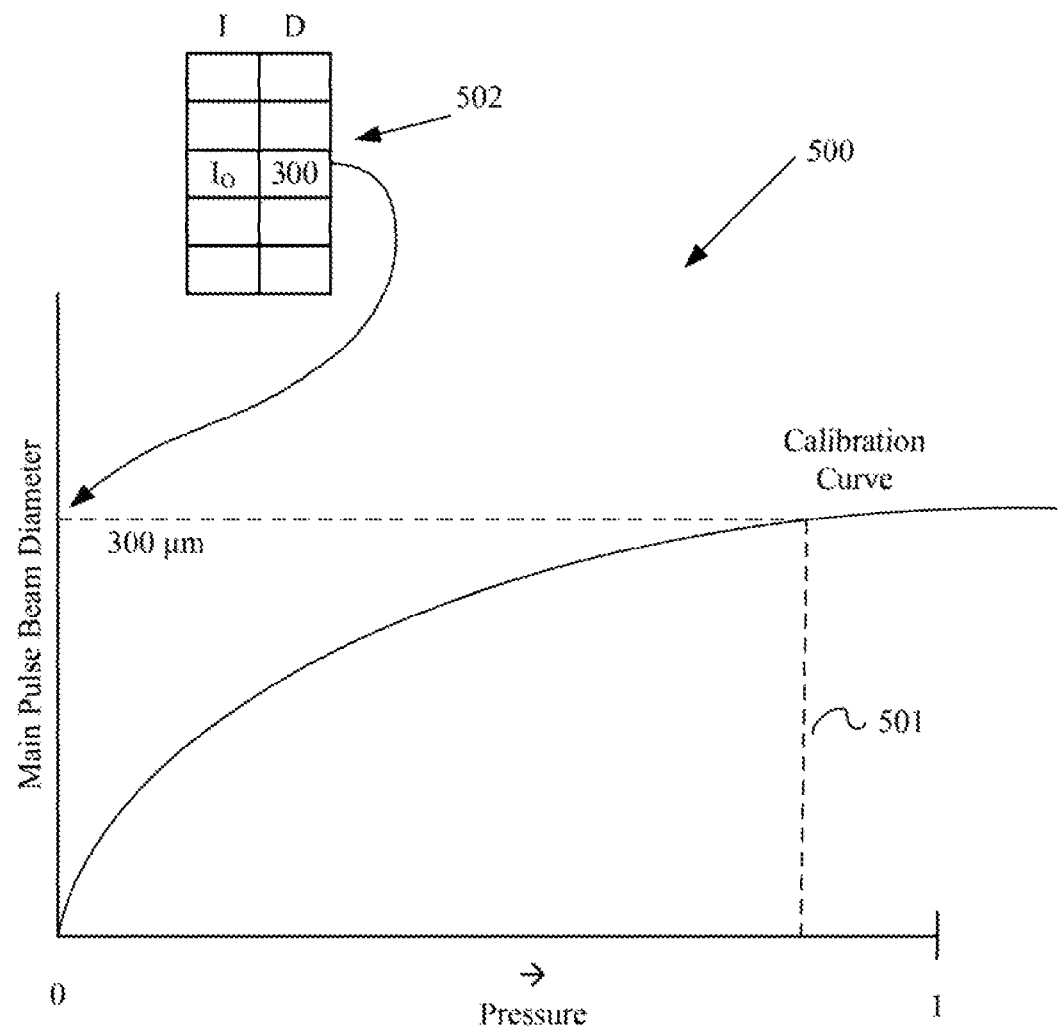
FIG. 5 illustrates a calibration curve and table for some specified optical model and VRM.

FIG. 5 illustrates an idealized data structure or calibration curve 500 for some specified optical model and VRM, where water pressure is applied to the VRM to set its radius of curvature. The x-axis in FIG. 5 is a normalized pressure and the y-axis in FIG. 5 provides the main pulse beam cross section diameter. For example, if for some power node the desired diameter of the main pulse beam 112 is 300 microns, then the value indicated by the x-ordinate 501 provides the desired normalized pressure. The calibration curve 500 may be represented by a data structure, such as for example a lookup table, mapping a set of normalized pressure values (or some variable indicative thereof) and beam diameters (or some variable indicative thereof) at some specified distance from the pre-pulse focal plane 202.

The desired diameter of the beam is a function of the desired power node. A table (or other data structure) may store a mapping of irradiance to desired main pulse beam diameter. For example, an entry in the table 502 for an irradiance of $I_0$ $GW/cm^2$ indicates a size of 300 microns for the diameter of the main pulse beam. In practice the table 502 and the calibration curve 500 may be combined into one table (or other data structure) to provide a mapping of irradiance (or power node) to some variable indicate of the curvature of a VRM.

Figure 6:
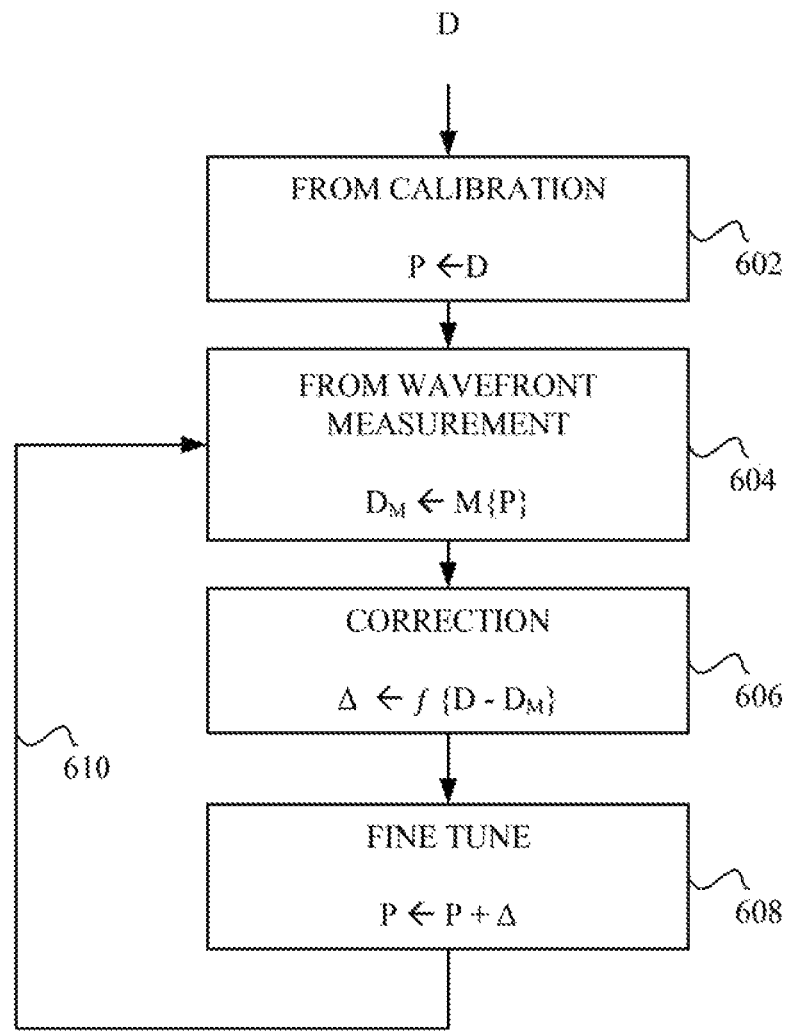
FIG. 6 illustrates fine tuning the radius of curvature for a variable radius mirror.

Performing steps 402 through 422 at various values for the radius of curvature or pressure associated with a VRM essentially results in the calibration curve 500 and the table 502. Once a radius of curvature is provided directly or indirectly by the calibration curve 500 for some desired value of the main beam cross section diameter to obtain a desired power node, the radius of curvature may be fine-tuned as indicated in step 424 of FIG. 4. The flow diagram of FIG. 6 illustrates step 424 of FIG. 4 for fine tuning the radius of curvature for a VRM. In the example of FIG. 6, the variable of interest is the normalized pressure associated with a VRM, but as discussed above, this variable may instead be a signal or dimensionless variable provided by the controller 312, where there is one-to-one mapping between such a signal or dimensionless variable and the radius of curvature.

Referring to FIG. 6, step 602 indicates that an initial normalized pressure P is obtained from some desired main pulse cross section diameter D. For example, for some desired power node, the table 502 and the calibration curve 500 may be accessed to obtain an initial value for the normalized pressure. Using this normalized pressure to set the radius of curvature of a VRM, the LPP EUV radiation source 100 is operated without irradiating target droplets, and the wavefront sensor 135 is used in conjunction with the appropriate optical model to obtain a measured diameter for the main pulse. This action is represented by step 604, where M{P} represents the above-described measurement utilizing the normalized pressure P, and $D_M$ represents the measured diameter.

Step 606 provides a correction value Δ, where the function $f$ denotes the mapping from the difference in beam diameter values, D–$D_M$, to the correction Δ. For example, the mapping may be a simple multiplication, where the correction Δ is proportional to the difference D–$D_M$ multiplied by the derivative of normalized pressure to beam diameter (evaluated at the desired beam diameter D), where the proportionality constant may be chosen less than one to avoid overshooting the correction. That is, $\Delta = \alpha(\partial P/\partial D)(D-D_M)$. The derivative may be estimated from the calibration curve 500.

In step 608, fine tuning is performed where the correction Δ is added to the current value of the normalized pressure to provide a new value of the normalized pressure. The steps in FIG. 6 may then be repeated as indicated by the arrow 610 with the new value for the normalized pressure.

For some embodiments, both of the mirrors 304 and 306 may be a VRM. For such embodiments, the flow diagram represented in FIG. 4 may be modified to provide a family of calibration curves or tables, where each curve or table in the family is indexed according to the pressure (or other variable indicative of radius of curvature) applied to one of the mirrors 304 and 306.

Figure 7:
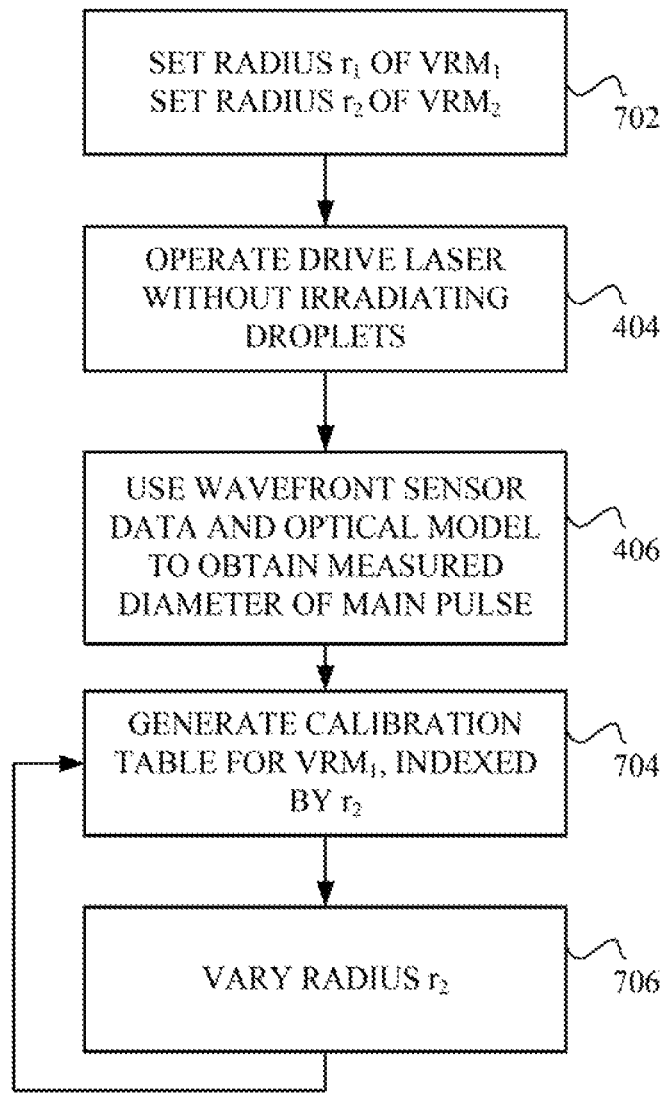
FIG. 7 illustrates a flow diagram for setting two variable radius mirrors according to an embodiment.

For example, FIG. 7 provides a flow diagram according to an embodiment. In step 702, a first radius of curvature $r_1$ is set for one of the mirrors 304 and 306, referred to as $VRM_1$, and a second radius of curvature $r_2$ is set for the other one of the mirrors 304 and 306, referred to as $VRM_2$. Steps 404 and 406 in FIG. 7 are the same as in FIG. 4. Step 704 is similar to step 408, except that one of the radiuses of curvature, say $r_2$, is held fixed while a calibration curve or table is generated while varying the other one of the radiuses of curvature, say $r_2$. This results in a calibration curve or table indexed by $r_2$. For example, the resulting data structure may be indicated as Table($r_2$). In step 706 the radius of curvature $r_2$ is varied and steps 404, 406 and 704 are performed again but for the new value of the radius of curvature $r_2$. Repeating this loop generates a family of tables, where each table is indexed according to $r_2$. That is, a data structure representing a family of tables Table($r_2$) is generated for various $r_2$.

Figure 8:
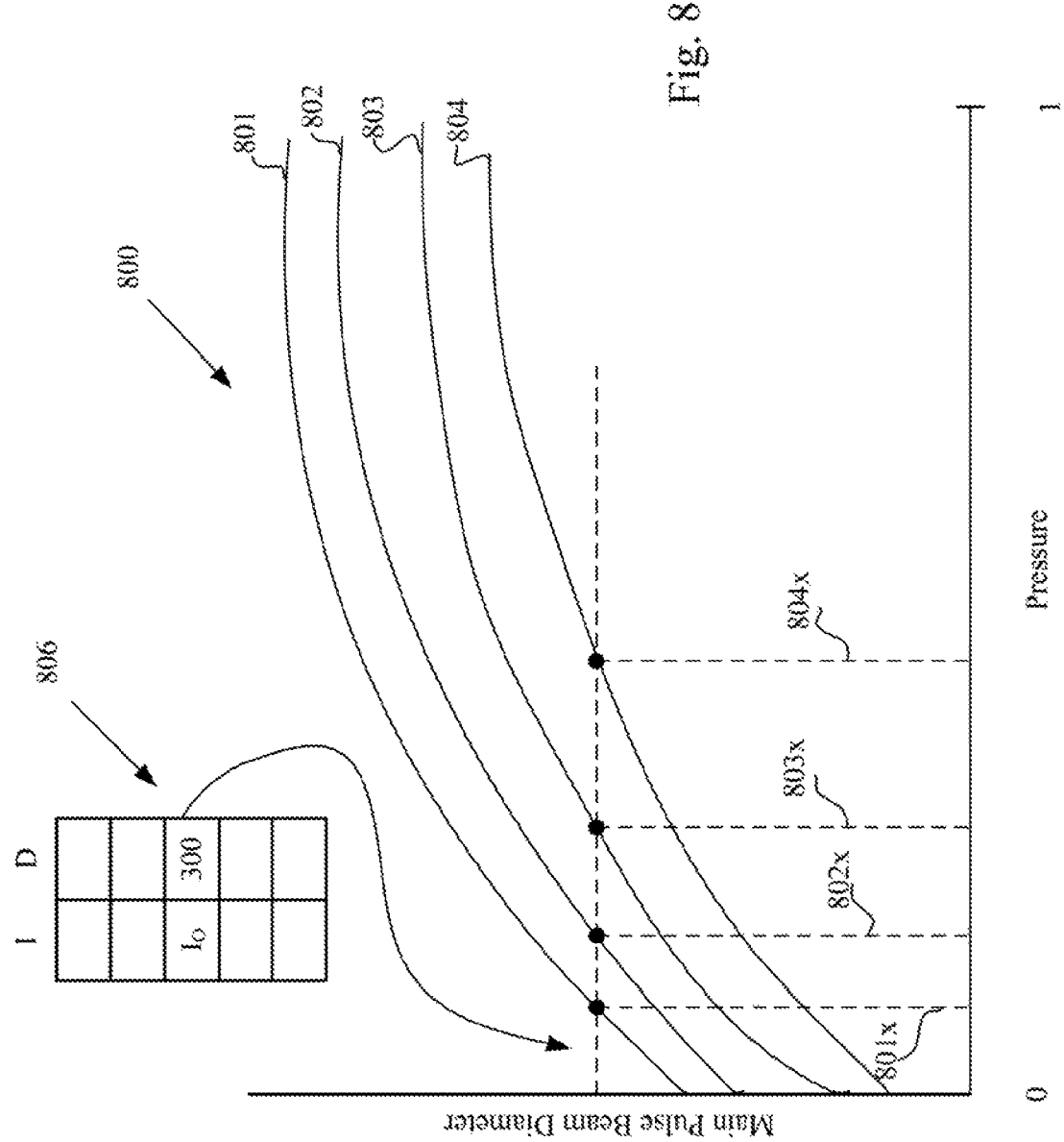
FIG. 8 illustrates a family of calibration curves and table for some specified optical model and two VRMs.

FIG. 8 represents a data structure 800 for a family of four calibration curves 801, 802, 803, and 804 for some specified optical model and two VRMs, where water pressure is applied to the VRMs to set their radiuses of curvature. The x-axis in FIG. 8 is a normalized pressure applied to one of the mirrors 304 and 306, which in FIG. 7 is referred to as VRM$_1$. The y-axis in FIG. 8 provides the main pulse beam cross section diameter. Similar to FIG. 5, if for some power node the desired diameter of the main pulse beam 112 is 300 microns, then the set of values indicated by the x-ordinates 801x, 802x, 803x, and 804x provides a set of normalized pressures. From this set of normalized pressures, a pressure is chosen for the second of the mirrors 304 and 306, referred to in FIG. 7 as VRM$_2$. The particular value for the chosen pressure may depend upon factors and considerations not material to the disclosed embodiments. For example, the least of the pressures in the set of pressures may be chosen. Or, the pressure may be chosen to minimize the absolute value of the difference in pressures applied to the VRMs.

The family of calibration curves 800 and the way in which the pressure among the set of pressures is chosen may be represented by a single data structure, such as for example a lookup table, mapping a set of normalized pressure values (or some variable indicative thereof) and beam diameters at some specified distance from the pre-pulse focal plane 202. As discussed in reference to FIG. 5, the desired diameter of the beam is a function of the desired power node. A table (or other data structure) may store a mapping of irradiance to desired main pulse beam diameter. For example, an entry in the table 806 for an irradiance of $I_0$ GW/cm$^2$ indicates a size of 300 microns for the diameter of the main pulse beam. In practice the table 806 and the family of calibration curves 800 along with the method for selecting the desired pressure from the set of pressures may be combined into one table (or other data structure) to provide a mapping of irradiance (or power node) to a two-tuple indicative of the radiuses of curvature of the VRMs.

Fine tuning for the case of two VRMs may be performed as discussed with respect to FIG. 6, where FIG. 6 is applied to one of the VRMs.

Each of the curves 801, 802, 803, and 804 may have a different set of ordinates. That is, the set of values for $r_1$ (or the pressures indicative of the radiuses of curvature) may vary for the different curves. In this case, then, there is a family of sets of values for the main pulse diameter and a family of sets of values for $r_1$ (or, e.g., pressure), where each set in the family of sets of values for the main pulse diameter and each set in the family of sets of values for $r_1$ (or, e.g., pressure) are indexed by values of $r_2$. For some embodiments, the family of sets of values for $r_1$ (or, e.g., pressure) may be a family of exactly one set of values for $r_1$ (or, e.g., pressure). That is, each curve 801, 802, 803, and 804 has the same set of ordinates.

In the above discussion, the values of $r_1$ and $r_2$ may be replaced with other quantities indicative of the radiuses of curvature, such as pressures, and the values of the beam diameter may be replaced with other quantities indicative of the values of the beam diameter. Accordingly, each curve in FIG. 8 (or representative data structure for each curve) represents a one-to-one mapping from a set of values indicative of the main pulse beam diameter to a set of values indicative of the radius of curvature for one of the variable radius mirrors. Each one-to-one mapping is indexed by a value indicative of the radius of curvature for the other one of the variable radius mirrors.

In the above discussion, reference has been made to a pre-pulse or a main pulse. It is to be understood that in practice, multiple pre-pulses or multiple main pulses are generated. Accordingly, depending upon context, reference to a pre-pulse may refer to any one of a number of pre-pulses in a sequence of pre-pulses at some particular time instances, where each time instance refers to a particular pre-pulse. Similar remarks apply to the main pulse.

Some or all of the steps illustrated in FIGS. 4-8 may be performed by one or more application specific integrated circuits (ASIC), one or more programmable processors, or combinations thereof. For example, in the embodiment of FIG. 3, a microprocessor 320 is shown as part of the controller 312 and may access instructions and data stored in a memory 322. Accordingly, the memory 322 may be viewed as a non-transitory storage medium for storing instructions that when executed by the microprocessor 320 perform some or all of the steps illustrated in FIG. 4. The tables discussed with respect to FIG. 5 may be stored in the memory 322.

In an embodiment, the pre-pulse focal plane is kept fixed while the main pulse focal plane is movable in-situ. In another embodiment, the main pulse focal plane is fixed while the pre-pulse focal plane is movable in-situ. In yet another embodiment, both the pre-pulse focal plane and the main pulse focal plane may be movable in-situ.

Figure 9A:
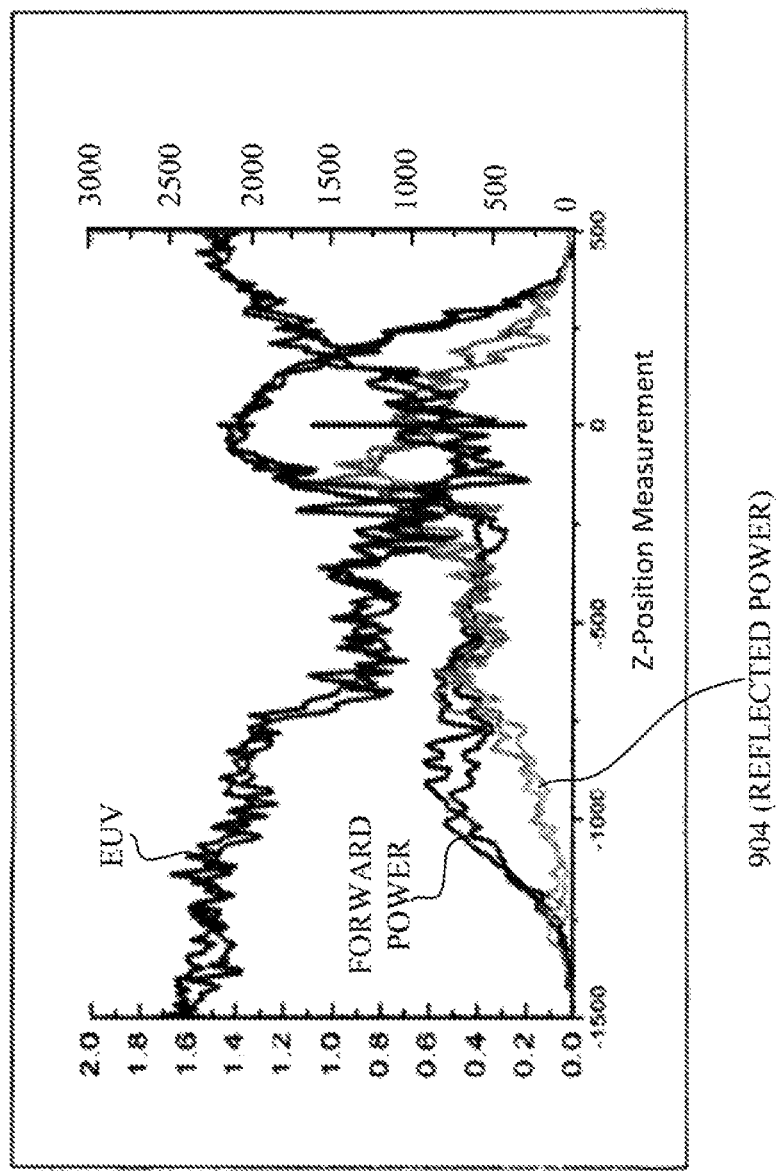
FIG. 9A shows an example graph of the forward power to the CO2 drive laser, the rejected (or reflected) power, and the resultant UV generation for a separation distance of 410 microns.
Figure 9B:
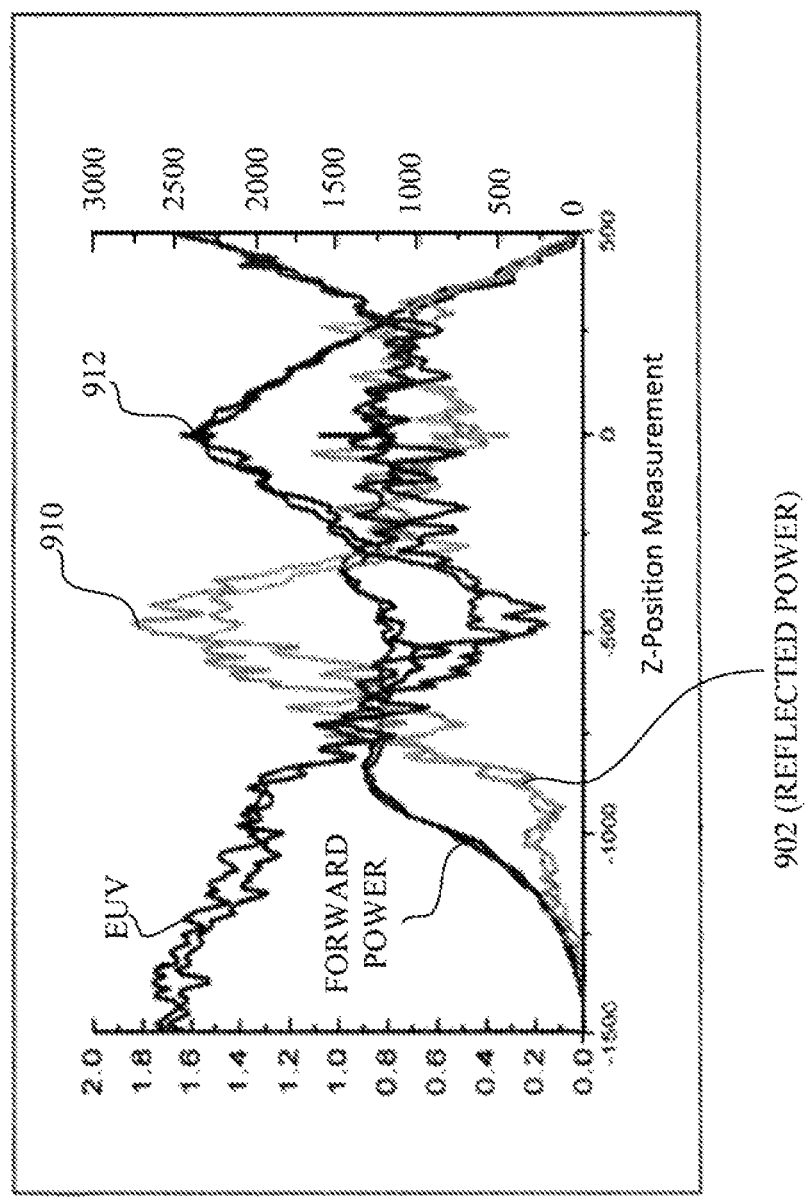
FIG. 9B shows an example graph of the forward power to the CO2 drive laser, the rejected (or reflected) power, and the resultant UV generation for a separation distance of 495 micron.

FIG. 9A and FIG. 9B show two example graphs of the forward power to the CO2 drive laser, the rejected (or reflected) power, and the resultant UV generation for two separation distances of 410 microns and 495 microns respectively. FIG. 9A and FIG. 9B are shown to illustrate the fact that the separation distance between the pre-pulse focal plane and the main pulse focal plane affects EUV generation and/or EUV stability and can thus be used as a control knob. In the context of the present invention, this separation distance between the pre-pulse focal plane and the main pulse focal plane can be modulated or altered by altering the curvature of the VRM(s) in the dichroic splitter module.

As can be seen, at a separation distance of 495 microns in FIG. 9B, the reverse-coupled power (i.e., reflected power) of line 902 of FIG. 9B is decreased relative to the reverse-coupled power (line 904 of FIG. 9A) at 410 microns in the vicinity z=0 in the x axis. In fact, at a separation distance of 495 microns, the peak 910 of reverse-coupled power line 902 is to the left of the peak EUV production 912, suggesting improved EUV stability at 495 microns separation relative to the EUV stability at 410 microns separation.

In one or more embodiments, the EUV light generating system may undergo test runs at various separation distances. At each separation distance, the reflected power and/or EUV light is/are monitored. Such data informs of the optimal separation distance for EUV generation and/or EUV stability. During production, such data may be employed to select the optimal separation distances to obtain the desired EUV generation and/or EUV stability, for example.

Generally speaking, the constant irradiance model determines the main pulse caustic size (diameter) for the optimal irradiance, and the target size is selected to match. For some EUV systems and/or target material composition, however, there may be an optimal target size for any given CO2 power/peak power. For example, the optimal CE (conversion efficiency) could prefer a large target to utilize incoming CO2 photons more efficiently (due to the increase in exposed fuel—e.g., tin atoms—to CO2 photons, which is typically in excess amount relative to tin atoms).

However, it may not be possible to increase the target size infinitely due to, for example, the heat transport effect that may prevent the plasma from reaching an ideal temperature for desirable emission (e.g., 13.5 nm). Alternatively or additionally, if the target size is unduly increased, the target material may become too thin. Further, this optimal target size may change as the CO2 power/peak power changes. The largest targets may not always be the most desirable targets for optimal CE. Some EUV systems may favor certain target sizes, as an alternative or additional consideration.

In these cases, VRMs can be used to tune the main pulse caustic to match this optimal target size in order to achieve optimal conversion efficiency. Further, VRMs can be used to set the axial separation distance between the main pulse focal plane and the pre-pulse focal plane to optimize EUV stability as discussed in connection with FIGS. 10A and 10B.

Figure 10A:
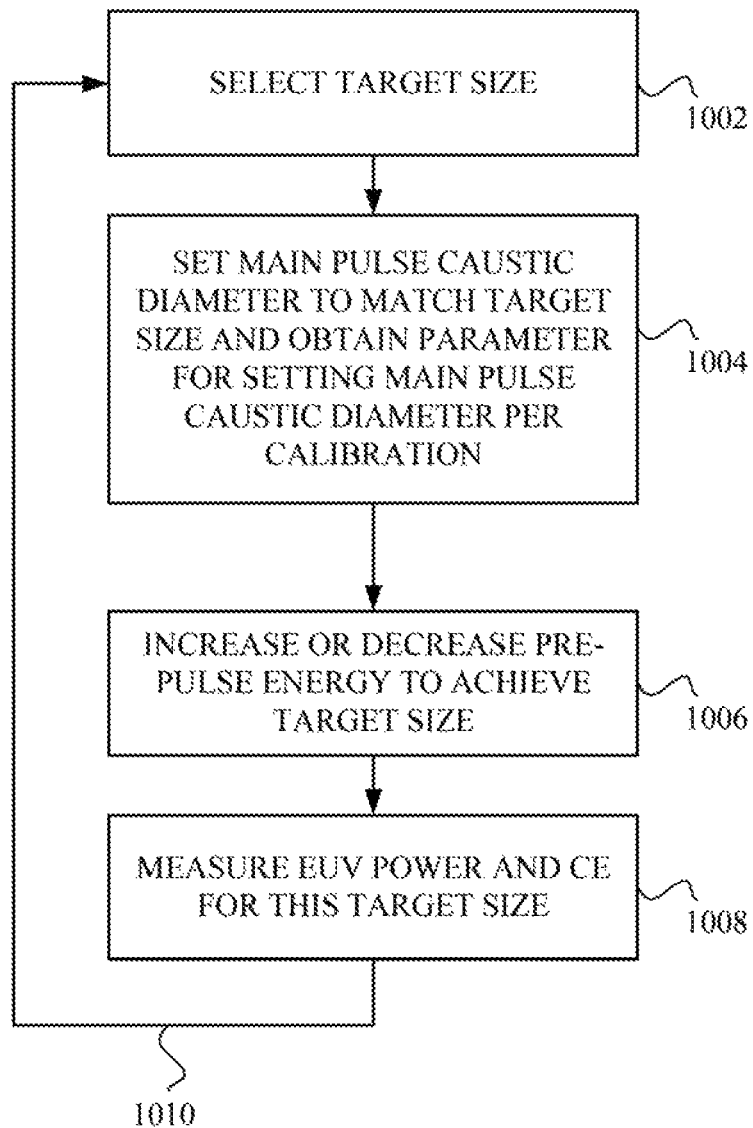
FIGS. 10A and 10B show, in accordance with embodiments of the invention, a procedure for determining the optimal target size for EUV generation.

FIG. 10A shows, in accordance with an embodiment of the invention, a procedure for determining the optimal target size for EUV generation in a given EUV system. After calibration (see for example FIG. 4) is performed, the optimal target size may be determined using the procedure of FIG. 10A.

Generally speaking, the optimal target size is known to be within a given range (which may be obtained from field experience, from expert opinion, or from theoretical speculation). The exact value for the optimal target size is not necessary to start the procedure of FIG. 10A as long as the two anchor points (smallest acceptable target size and largest acceptable target size) can be estimated. In an example, a range of target diameters between 100 microns and 400 microns tend to be useful for EUV generation for disc-shaped targets.

Steps 1002-1008 will iterate through each target size in the range of possible target sizes and measure the EUV power and conversion efficiency (and other parameters if desired such as rejected power) for each target size under consideration. Once the measurements are made, the optimal EUV power/conversion efficiency/rejected power point may be determined (based on some predefined criteria) and the corresponding target size is then deemed the optimal target size for EUV generation for that system.

In step 1002, an initial target size is selected. This initial target size is simply the start and may be the smallest target size or may be the largest target size, or some other target size The method then measures the optimal EUV power and/or CE conversion ratio using the steps 1004-1008 for that target size.

In step 1004, the main pulse caustic diameter is set to match the target size being iterated (i.e., currently being considered in this iteration). In practice, it is often (but not required) that the main pulse caustic diameter be slightly larger than the target size diameter (e.g., about 0-20% larger, preferably about 10% larger in diameter). For example, if the target size under consideration is 100 microns in diameter, then the main pulse caustic may be between 100 microns and 110 microns in diameter, for example.

This caustic diameter size is then compared against the calibration curve of FIG. 5 (the calibration curve is determined by the procedure of FIG. 4) or an analogous calibration table to determine the parameter(s) employed for setting the VRM. Such parameter may represent, for example, the water pressure as discussed earlier.

In step 1006, the pre-pulse laser energy is also tuned to achieve the target size. For example, the pre-pulse laser energy may be increased or decreased to achieve the target size under consideration.

In step 1008, the EUV power and the CE conversion energy may be measured for the target size under consideration while the system operates using the parameters acquired in steps 1004 and 1006.

Thereafter, the target size is changed and steps 1004-1008 are iterated again (represented by line 1010) for the new target size. The iteration may be performed until all target sizes in the range may be tested in some embodiments or may be performed until a local maxima is found for the EUV power, in other embodiments. This is because EUV power tends to be a dominant desired parameter in EUV generation. However, it is possible that other considerations such as EUV stability (determined by examining the rejected power, for example) or CE factor may be additional or alternative considerations. The optimal combination of EUV power/CE conversion/EUV stability may be predefined by the manufacturer or the customer, for example or may be selected by a process engineer given the different measured combinations of EUV power/CE conversion/EUV stability.

It should be appreciated that in iterating through the target sizes to find the optimal target size for EUV generation, the change in target size may be linear (e.g., step-wise smallest to largest or largest to smallest) or may, in some embodiments, change in accordance with certain search-type algorithms (e.g., binary search) to find the local maxima for the EUV power and CE conversion.

Figure 10B:
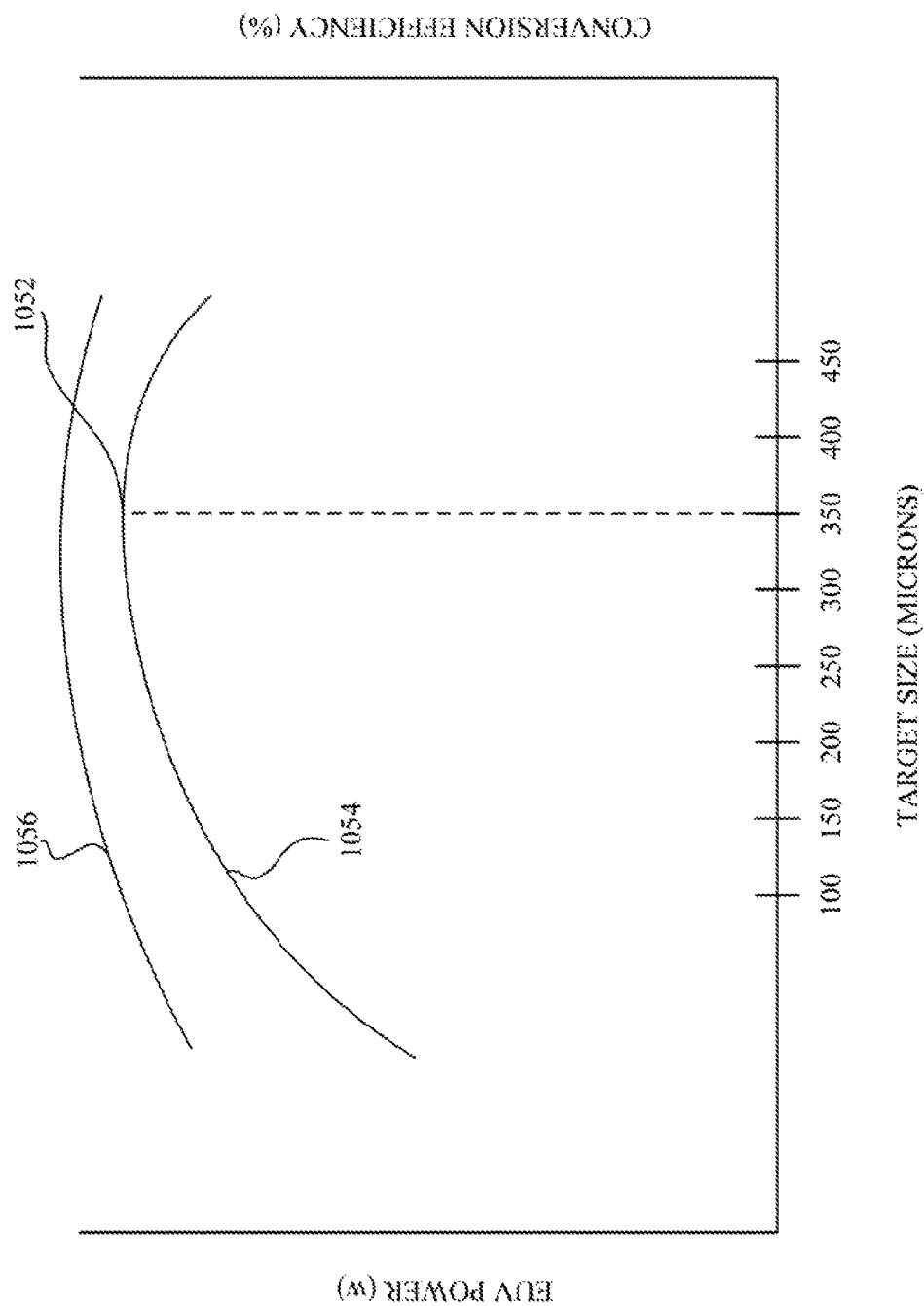

FIG. 10B shows, in accordance with an embodiment, a technique for selecting the optimal target size for EUV generation once the plurality of target sizes are iterated through in order to measure the EUV power/CE ratio. In the example of FIG. 10B, the plot of EUV power (in watts) versus target size and conversion efficiency (in %) versus target size are super-imposed in a single plot. In this example, the maxima point 1052 in EUV power curve 1054 is selected and the corresponding target size of 350 microns diameter is deemed to be the optimal target size for EUV generation. At 350 microns, the CE value (line 1056) happens to be nearly maximized as well in the example of FIG. 10B. In this example, EUV power being the dominant consideration so 350 microns is deems to be the optimal target size since it maximizes EUV power and nearly maximizes CE.

While this invention has been described in terms of several preferred embodiments, there are alterations, permutations, and equivalents, which fall within the scope of this invention. The invention should be understood to also encompass these alterations, permutations, and equivalents. It should also be noted that there are many alternative ways of implementing the methods and apparatuses of the present invention. Although various examples are provided herein, it is intended that these examples be illustrative and not limiting with respect to the invention.

The invention claimed is:

1. An extreme ultraviolet radiation source comprising:
   a droplet generator to provide a droplet;
   at least one laser source to provide a pre-pulse to irradiate the droplet so as to create a target droplet, the pre-pulse associated a pre-pulse focal plane, and to provide a main pulse to irradiate the target droplet into a plasma state, the main pulse associated with a main pulse focal plane;

a dichroic splitter module to focus the pre-pulse and the main pulse, the dichroic splitter module comprising, at least one variable radius mirror; and a controller coupled to the at least one variable radius mirror to adjust a radius of curvature of the at least one variable radius mirror to adjust a distance between the pre pulse focal plane and the main pulse focal plane of the main pulse, the controller further setting the radius of curvature of the at least one variable radius mirror to an initial value based upon a desired value for a beam diameter of the main pulse at a specified distance from the pre-pulse focal plane, wherein setting the radius of curvature of the at least one variable radius mirror includes setting a pressure of a fluid applied to the at least one variable radius mirror.

2. The extreme ultraviolet radiation source of in claim 1, the controller further to operate the at least one laser source to provide the main pulse based with the radius of curvature set to the initial value;

measure the main pulse with a wavefront sensor to provide a measured value corresponding to the beam diameter of the main pulse at the specified distance from the pre-pulse focal plane; and adjust the radius of curvature of the at least one variable radius mirror based upon the initial value and the measured value.

3. The extreme ultraviolet radiation source of in claim 1, the at least one laser source comprising:

a first laser source to provide the pre-pulse; and a second laser source to provide the main pulse.

4. The extreme ultraviolet radiation source of in claim 1, the dichroic splitter module further comprising:

a first diehroic splitter to reflect the main pulse to the at least one variable radius mirror; and a second dichroic splitter to reflect the main pulse toward the target droplet after the main pulse has been reflected by the at least one variable radius mirror.

5. A method for providing a laser beam to a chamber configured for generating EUV light, comprising:

propagating a pre-pulse through a dichroic splitter module toward the chamber, the pre-pulse having a pre-pulse focal plane within the chamber, the dichroic splitter module comprising a first dichroic splitter, a second dichroic splitter, and a variable radius mirror having a radius of curvature;

propagating a main pulse through the dichroic splitter module toward the chamber, the propagating the main pulse through the dichroic splitter module comprising reflecting the main pulse with the variable radius mirror and reflecting the main pulse with the second dichroic splitter toward the chamber, the main pulse having a beam diameter at a specified distance from the pre-pulse focal plane;

measuring the main pulse to provide a set of values indicative of the beam diameter at the specified distance for a set of values indicative of the radius of curvature of the variable radius mirror; and storing in a memory a data structure indicative of the set of values indicative of the beam diameter and the set of values indicative of the radius of curvature of the variable radius mirror, the data structure providing a one-to-one mapping of the set of values indicative of the beam diameter to the set of values indicative of the radius of curvature of the variable radius mirror.

6. The method of in claim 5, further comprising:

setting the radius of curvature of the variable radius mirror to an initial value based on the data structure.

7. The method of in claim 6, further comprising:

setting the radius of curvature of the variable radius mirror to the initial value based on a desired value the beam diameter.

8. The method of in claim 6, further comprising:

setting the radius of curvature of the variable radius mirror to the initial value based on a desired power node when converting target droplets in the chamber to a plasma state to provide extreme ultraviolet radiation.

9. The method of in claim 8, further comprising:

providing the main pulse at various time instances to a plurality of target droplets in the chamber, the various time instances occurring after the setting the radius of curvature of the variable radius mirror.

10. The method of in claim 6, comprising:

measuring the main pulse with a wavefront sensor to provide a measured value corresponding to the beam diameter of the main pulse at the specified distance from the pre-pulse focal plane: and adjusting the radius of curvature of the at least one variable radius mirror based upon the initial value of the radius of curvature and the measured value.

11. The method of in claim 10, further comprising:

providing the main pulse at various time instances to a plurality of target droplets in the chamber, the various time instances occurring after the adjusting the radius of curvature of the at least one variable radius mirror.

12. A method for providing, a laser beam to a chamber configured for generating EUV light, comprising:

propagating a pre-pulse through a diehroic splitter module toward the chamber, the pre-pulse having a pre-pulse focal plane within the chamber, the dichroic splitter module comprising a first dichroic splitter, a second dichroic splitter, a first variable radius mirror having a first radius of curvature, and a second variable radius mirror having a second radius of curvature;

propagating a main pulse through the dichroic splitter module toward the chamber, the propagating the main pulse through the dichroic splitter module comprising reflecting the main pulse with the first dichroic splitter, reflecting the main pulse with the first variable radius mirror and the second variable radius mirror, and reflecting the main pulse with the second dichroic splitter toward the chamber, the main pulse having, a beam diameter at a specified distance from the pre-pulse focal plane;

measuring the main pulse to provide as family of sets of values indicative of the beam diameter at the specified distance for a family of sets of values indicative of the first radius of curvature of the first variable radius mirror, each set of values indicative of the beam diameter and each set of values indicative of the first radius of curvature indexed by a set of values indicative of the second radius of curvature of the second variable radius mirror; and storing in a memory a data structure indicative of the flintily of sets of values indicative of the beam diameter and the family of sets of values indicative of the first radius of curvature of the first variable radius mirror.

13. The method of in claim 12, wherein the family of sets of values indicative of the first radius of curvature of the first variable radius mirror consists of one set of values indicative of the first radius of curvature of the first variable radius mirror.

14. The method of in claim 12, wherein the data structure is indicative of a family of one-to-one mappings, each one-to-one mapping in the family of one-to-one mappings between a set of values in the family of sets of values indicative of the beam diameter and a set of values in the family of sets of values indicative of the first radius of curvature of the first variable radius mirror, each one-to-one mapping indexed by the set of values indicative of the second radius of curvature of the second variable radius mirror.

15. The method of in claim 12, further comprising:
setting the first radius of curvature of the first variable radius mirror to a first initial value based on the data structure; and
setting the second radius of curvature of the second variable radius mirror to a second initial value based on the data structure.

16. The method of in claim 15, further comprising:
setting the first radius of curvature of the first variable radius mirror to the first initial value based on a desired value for the beam diameter; and
setting the second radius of curvature of the second variable radius mirror to the second initial value based on the desired value for the beam diameter.

17. The method of in claim 15, further comprising:
setting the first radius of curvature of the first variable radius mirror to the first initial value and setting the second radius of curvature of the second variable radius mirror to the second initial value based on a desired power node when convening target droplets in the chamber to a plasma state to provide extreme ultraviolet radiation.

18. The method of in claim 17, further comprising:
providing the main pulse at various time instances to a plurality of target droplets in the chamber, the various time instances occurring after the setting the first radius of curvature of the first variable radius mirror.

19. The method of in claim 15, further comprising:
measuring the main use with a wavefront sensor to provide a measured value corresponding to the beam diameter of the main pulse at the specified distance from the pre-pulse focal plane: and
adjusting the first radius of curvature of the first variable radius mirror based upon the first initial value of the radius of curvature and the measured value.

20. The method of in claim 19, further comprising:
providing the main pulse at various time instances to a plurality of target droplets in the chamber, the various time instances occurring after the adjusting the first radius of curvature of the first variable radius mirror.

* * * * *